US012570114B2

(12) United States Patent
Magistroni et al.

(10) Patent No.: US 12,570,114 B2
(45) Date of Patent: Mar. 10, 2026

(54) CALIBRATION METHOD AND SYSTEM OF A SENSOR FOR TYRES

(71) Applicant: Pirelli Tyre S.p.A., Milan (IT)

(72) Inventors: Andrea Magistroni, Milan (IT);
Alberto Citton, Borso del Grappa (IT);
Paolo Giulio Aldo Artesani, Milan
(IT); Gabriele Montorio, Milan (IT);
Marco Rocca, Milan (IT);
Massimiliano Sallusti, Milan (IT)

(73) Assignee: PIRELLI TYRE S.p.A., Milan (IT)

( * ) Notice: Subject to any disclaimer, the term of this
patent is extended or adjusted under 35
U.S.C. 154(b) by 318 days.

(21) Appl. No.: 18/557,022

(22) PCT Filed: Apr. 6, 2022

(86) PCT No.: PCT/IT2022/050082
§ 371 (c)(1),
(2) Date: Oct. 24, 2023

(87) PCT Pub. No.: WO2022/229993
PCT Pub. Date: Nov. 3, 2022

(65) Prior Publication Data
US 2024/0227468 A1      Jul. 11, 2024

(30) Foreign Application Priority Data

Apr. 28, 2021      (IT) ........................ 102021000010712

(51) Int. Cl.
*B60C 23/04* (2006.01)
*B60C 23/06* (2006.01)
*B60C 25/05* (2006.01)

(52) U.S. Cl.
CPC ...... *B60C 23/0474* (2013.01); *B60C 23/0471*
(2013.01); *B60C 23/0488* (2013.01); *B60C
23/064* (2013.01); *B60C 25/056* (2013.01)

(58) Field of Classification Search
CPC .............. B60C 23/064; B60C 23/0474; B60C
23/0471; B60C 23/0488; B60C 25/056
See application file for complete search history.

(56) References Cited

U.S. PATENT DOCUMENTS

| | | | |
|---|---|---|---|
| 8,833,151 B2 | 9/2014 | Tebano et al. | |
| 8,849,601 B2 | 9/2014 | Vassilieff | |

(Continued)

FOREIGN PATENT DOCUMENTS

| | | |
|---|---|---|
| CN | 101509936 A | 8/2009 |
| CN | 102341712 A | 2/2012 |

(Continued)

OTHER PUBLICATIONS

International Search Report form the European Patent Office in
corresponding International Application No. PCT/IT2022/050082
mailed Jul. 26, 2022.

(Continued)

*Primary Examiner* — Stephen D Meier
*Assistant Examiner* — Quang X Nguyen
(74) *Attorney, Agent, or Firm* — Finnegan, Henderson,
Farabow, Garrett & Dunner, L.L.P.

(57) ABSTRACT

Calibration method (200), and related system (100), of a
sensor (70) for tyres, comprising, with the sensor (70)
mounted at a crown portion (31) of a tyre (99) and during an
advancement of a vehicle onto which the tyre (99) is fitted:
a) acquiring (1), from the sensor (70), a motion signal
representative of a motion of the crown portion (31); b)
acquiring (2) a respective current value of one or more
operating conditions of the tyre (99); c) processing (3) the
motion signal for obtaining from the motion signal a first
value representative of a calibration physical quantity asso-
ciated with the motion of the crown portion (31) at said
respective current value of the one or more operating
conditions; d) calculating (4) a second value representative
of the calibration physical quantity at the respective current
value of the one or more operating conditions, by a prede-
termined mathematical correlation between the calibration
physical quantity and the one or more operating conditions;
e) iterating steps a), b), c) and d) for obtaining a first set of
first values representative of the calibration physical quan-
tity varying the respective current value of the one or more
operating conditions, and a corresponding second set of
second values representative of the calibration physical
quantity; f) calibrating (6) the sensor (70) by a comparison
between the first and second set.

10 Claims, 4 Drawing Sheets

(56) References Cited

U.S. PATENT DOCUMENTS

| | | | | |
|---|---|---|---|---|
| 2013/0211741 | A1* | 8/2013 | Tebano | B60W 40/068 702/42 |
| 2013/0263655 | A1 | 10/2013 | Tebano et al. | |
| 2020/0164703 | A1 | 5/2020 | Singh et al. | |
| 2021/0239731 | A1* | 8/2021 | Guinart | G01L 17/00 |

FOREIGN PATENT DOCUMENTS

| | | | |
|---|---|---|---|
| CN | 107848344 | A | 3/2018 |
| CN | 110461628 | A | 11/2019 |
| EP | 3659831 | A1 | 6/2020 |
| WO | 2008072453 | A1 | 6/2008 |
| WO | 2020025315 | A1 | 2/2020 |
| WO | 2020070051 | A1 | 4/2020 |

OTHER PUBLICATIONS

Written Opinion of the International Searching Authority from the European Patent Office in corresponding International Application No. PCT/IT2022/050082 mailed Jul. 26, 2022.
Notification of the First Office Action dated Jul. 2, 2024, from China National Intellectual Property Administration, in counterpart Chinese Application No. 202280024183.3.

* cited by examiner

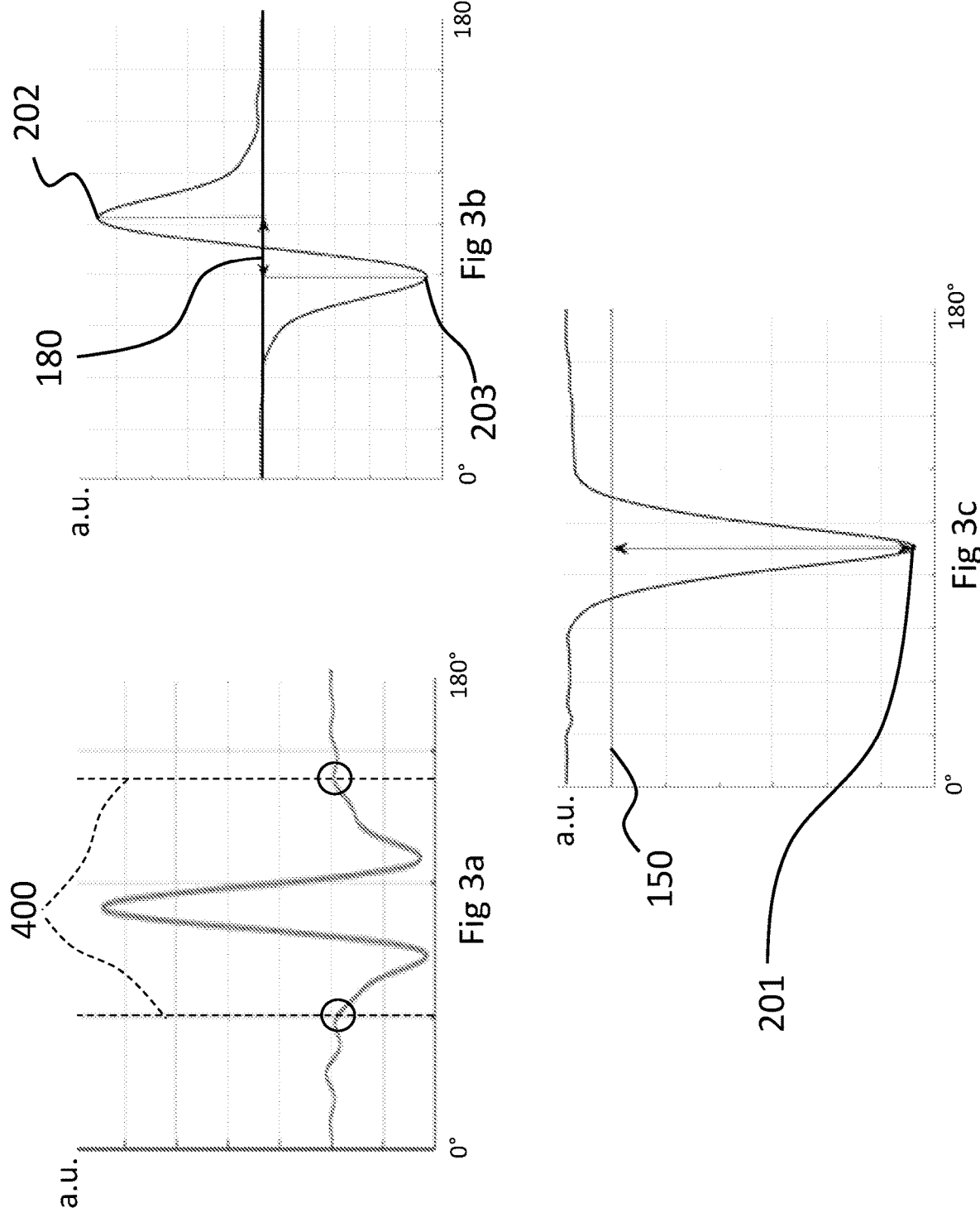

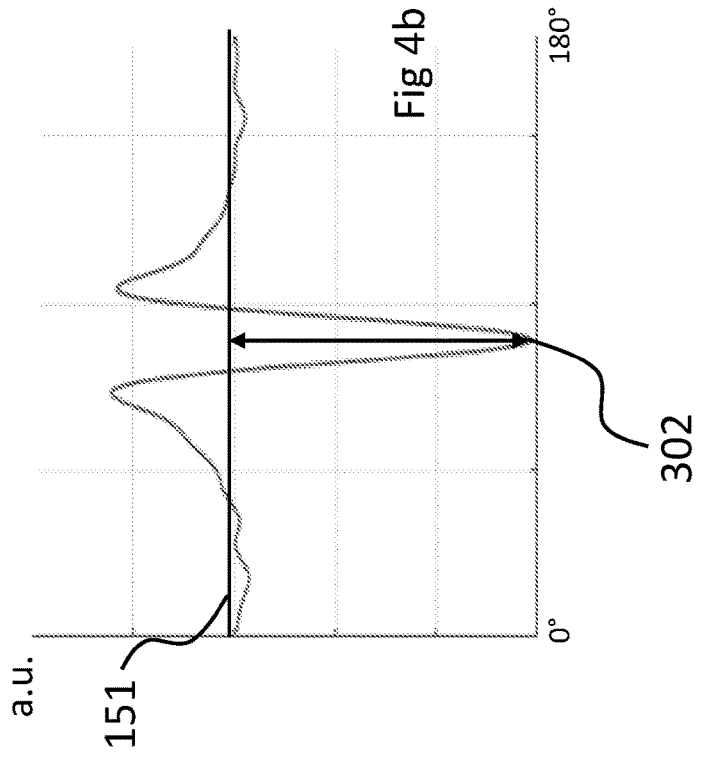
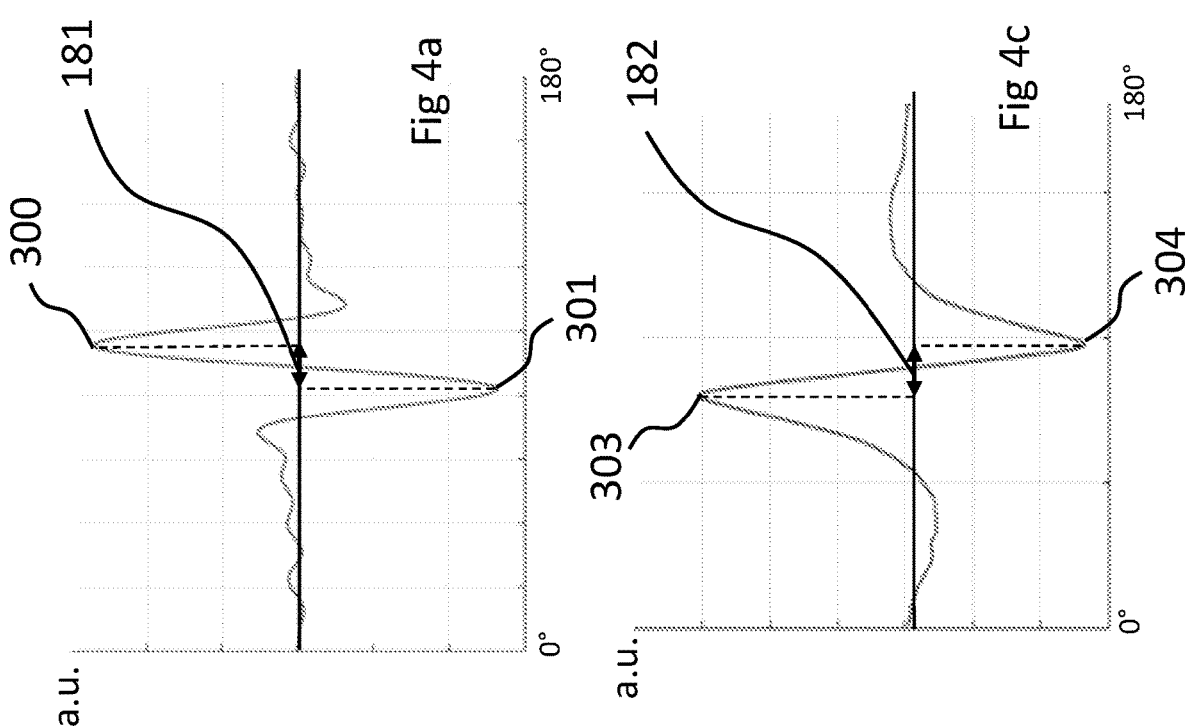

CALIBRATION METHOD AND SYSTEM OF A SENSOR FOR TYRES

This application is a national stage entry application under 35 U.S.C. § 371 of International Application No. PCT/IT2022/050082, filed on Apr. 6, 2022, and claims priority to Italian Application No. 102021000010712, filed Apr. 28, 2021; the contents of each application is incorporated herein by reference in its entirety.

TECHNICAL FIELD OF THE INVENTION

The present invention relates to a calibration method, and a related system, of a sensor for tyres.

STATE OF THE ART

Typically, a tyre for vehicle has a substantially toroidal structure around a rotation axis thereof during operation, and it has an equatorial plane perpendicular to the rotation axis, said equatorial plane being typically a plane of (substantial) geometric symmetry (e.g., ignoring any minor asymmetries, such as the tread design and/or the writing on the sides and/or structure or profile asymmetries).

"Inner cavity" means the space delimited by the inner surface of the tyre and by the surface of the rim which faces towards the inner surface of the tyre, when fitted.

"Crown portion" means the tyre portion placed at the tread band.

The terms "radial" and "axial" are used with reference respectively to a direction substantially perpendicular to and to a direction substantially parallel to the rotation axis of the tyre.

The term "tangential" is used with reference to a direction substantially perpendicular to both the radial direction and the axial direction (e.g., generally oriented according to the rolling direction of the tyre).

The terms lateral, vertical and horizontal refer respectively to the axial direction, the vertical direction and the horizontal direction.

"Footprint" means the portion of outer surface of the tread band which, during the rolling of the tyre fitted and subjected to a load (for example due to the fitting on a vehicle), is in contact at every moment with the rolling surface. The footprint typically has a substantially null curvature (or substantially infinite curvature radius), or in any case it substantially assumes the conformation of the rolling surface.

"Footprint area" means the part of the crown portion that is at the footprint at each moment.

The term "calibrating", or similar, means the operation of correlating the value of the output signal of the sensor (i.e., the uncalibrated signal, for example a voltage or electric current value) with the real value of the physical quantity that the sensor detects (e.g., acceleration).

For some tyre types, especially those for which high-level performances are required, monitoring devices have been studied for some time which, when fitted inside said tyres, will have to detect the characteristics of the tyre, so as to allow a substantially real-time control of the operation and of the conditions of the tyre itself. For the purposes of these detections, the monitoring devices will comprise sensors capable of detecting a motion physical quantity, such as deformation, speed or acceleration, in order to acquire useful information for the evaluation of the current conditions of the status of the tyre (wear, integrity, etc) or of the interaction between tyre and ground (aquaplane, grip, etc).

U.S. Pat. No. 8,849,601B2 and WO2020025315A1 disclose a calibration method and a related system of a sensor for tyres mounted on a rim.

SUMMARY OF THE INVENTION

The Applicant has observed that the sensors for tyres require a precise calibration for being able to extract precise and reliable information on the status and/or on the behaviour of the tyre from the acquired and calibrated signal. According to the Applicant, due to the limitations of the manufacturing processes, this calibration has to be performed for each sensor to be mounted on the tyre and, typically, it is carried out through sophisticated instruments before mounting on the tyre. This calibration is therefore onerous in terms of execution times of the tests, and/or of costs of the machinery and/or of employed personnel (typically a qualified operator).

The Applicant further considers advantageous mounting the sensor directly on the tyre, and in particular on the inner surface at the crown portion, rather than on the rim. In this way, a physical quantity, related to the stresses that the tyre undergoes when fitted on a vehicle and during rolling (for example the linear acceleration), detected by the sensor, provides information on the physical behaviour (e.g., in terms of deformations) of the tyre during the rolling.

The Applicant believes that the known calibration methods of a sensor for tyres mentioned above are difficult, or impossible, to apply to a sensor mounted on the inner surface of the tyre.

The Applicant has therefore faced the problem of calibrating a sensor mounted at the crown portion of a tyre in a precise manner and with a reduced use of instrumental and/or human resources.

According to the Applicant, the aforesaid problem is solved by a calibration method, and a related system, as specified in the attached claims and/or in the following.

According to an aspect the invention relates to a calibration method of a sensor for tyres.

Preferably, with said sensor fitted at a crown portion of a tyre and during an advancement of a vehicle onto which said tyre is fitted, the method comprises:

a) acquiring, from said sensor, a motion signal representative of a motion of said crown portion;

b) acquiring a respective current value of one or more operating conditions of said tyre;

c) processing said motion signal for obtaining from said motion signal a first value representative of a calibration physical quantity associated with said motion of the crown portion at said respective current value of said one or more operating conditions;

d) calculating a second value representative of said calibration physical quantity at said respective current value of said one or more operating conditions, by a predetermined mathematical correlation between said calibration physical quantity and said one or more operating conditions;

e) iterating steps a), b), c) and d) for obtaining a first set of first values representative of said calibration physical quantity varying said respective current value of said one or more operating conditions, and a corresponding second set of second values representative of said calibration physical quantity;

f) calibrating said sensor by a comparison between said first and second set.

According to another aspect the invention relates to a calibration system of a sensor for tyres, the system comprising:

said sensor fitted at a crown portion of a tyre and configured for detecting a motion of said crown portion;

at least one processing unit in communication with said sensor and programmed and configured for, during an advancement of a vehicle on which said tyre is fitted:

a) receiving, from said sensor, a motion signal representative of said motion of said crown portion;

b) acquiring a respective current value of one or more operating conditions of said tyre;

c) processing said motion signal for obtaining from said motion signal a first value representative of a calibration physical quantity associated with said motion of the crown portion at said respective current value of said one or more operating conditions;

d) calculating a second value representative of said calibration physical quantity at said respective current value of said one or more operating conditions, by a predetermined mathematical correlation between said calibration physical quantity and said one or more operating conditions;

e) iterating steps a), b), c) and d) for obtaining a first set of first values representative of said calibration physical quantity varying said respective current value of said one or more operating conditions, and a corresponding second set of second values representative of said calibration physical quantity;

f) calibrating said sensor by a comparison between said first and second set.

The Applicant has realized that the use of the aforesaid predetermined correlation allows to estimate the real values of the calibration physical quantity (i.e., the second values) at current values of the one or more operating conditions of the tyre, independently of the calibration of the sensor.

The Applicant has understood that it is advantageously possible calibrating the sensor in a reliable, precise and efficient way by correlating the aforesaid set of real values (i.e., the second set) of the calibration physical quantity, independent of the calibration, with the set of the values (i.e., the first set) obtained directly from the processing of the uncalibrated motion signal in output from the sensor, these (uncalibrated) values of the first set being representative of the same calibration physical quantity at the same current values of the one or more operating conditions of the tyre used to determine the second set.

It is observed that the calibration physical quantity can coincide with the physical quantity directly detected by the sensor (e.g., an acceleration), or it can be different (e.g., a displacement/deformation or a speed, as described below) but, typically, correlated to the detected physical quantity, for example through one or more derivation or integration operations on the motion signal.

Furthermore, the iteration of the steps a), b), c) and d) of the method of the present invention as the current values of the one or more operating conditions vary, allows to derive different values of the calibration physical quantity from the uncalibrated signal, providing accuracy and/or consistency to the calibration method of the present invention.

Following these considerations, the Applicant has realized that the calibration method and system of the present invention have various advantages.

First of all, the calibration method of the present invention is suitable for use for a sensor mounted on the crown portion of the tyre.

The Applicant has verified that obtaining the first and second values representative of the calibration physical quantity allows calibrating the sensor during the normal use of the vehicle, for example during the first km of use of the tyre, without the need to carry out a specific pre-calibration for each sensor. This makes the calibration of the sensor for tyres according to the present invention industrially and effectively feasible.

Furthermore, according to the Applicant, the calibration is easy to implement, being sufficient the first values representative of the calibration physical quantity (obtained from the uncalibrated motion signal acquired by the sensor), the second values representative of the calibration physical quantity (i.e., the real values estimated through the predetermined mathematical correlation) and the current values of the one or more operating conditions of the tyre, which are easy to find.

The present invention in one or more of the aforesaid aspects can have one or more of the following preferred features.

Preferably said at least one processing unit is programmed and configured for carrying out anyone of the embodiment of the method of the present invention.

Preferably said comparison between said first and second set comprises calculating an interpolating function (e.g., a linear or polynomial regression) on the first and second values of, respectively, said first and second set. In this way the calibration of the sensor is simply and accurately obtained.

Preferably said calibrating said sensor comprises calculating at least one calibration coefficient of the sensor (e.g., a gain of a characteristic curve of the sensor).

Preferably said calibrating said sensor comprises, for each iterating the steps a), b), c), and d), calculating at least one respective calibration coefficient by comparison between said respective first and second set.

Preferably it is provided interrupting said iterating the steps a), b), c), and d) provided that a predetermined output condition is verified, more preferably said output condition being determined by statistical analysis (e.g., calculating the variance or the standard deviation) on the calculated calibration coefficients.

Preferably said iterating the steps a), b), c), and d) is carried out at each turn of the tyre.

Preferably said processing said motion signal (and said calculating the second value representative of the physical quantity) is carried out provided that a lateral acceleration of the vehicle is less than or equal to 5 m/s$^2$, more preferably less than or equal to 2 m/s$^2$, even more preferably less than or equal to 1 m/s$^2$ (in absolute value). Typically, the method considers the first and second values obtained during a (substantially) linear advancement of the vehicle, for example not during turns at high speed.

Preferably said processing said motion signal (and said calculating the second value representative of the physical quantity) is carried out provided that a longitudinal acceleration of the vehicle is less than or equal to 5 m/s$^2$, more preferably less than or equal to 2 m/s$^2$, even more preferably less than or equal to 1 m/s$^2$ (in absolute value). Typically, the method considers the first and second values representative of the physical quantity obtained provided a (substantially) constant forward speed of the vehicle, i.e., not during the phases of high acceleration or braking of the vehicle. Preferably said processing said motion signal (and said calculating the second value representative of the physical quantity) is carried out provided that a forward speed of the vehicle is greater than or equal to 20 km/h, more preferably greater than or equal to 30 km/h.

The Applicant has experimentally verified that upon the occurrence of one or more of these conditions it is possible to limit possible disturbances (extrinsic to the rolling) on the motion signal, thus limiting the time needed to carry out the calibration and improving the reliability, the accuracy and/or the precision of the calibration.

Preferably the system comprises a further sensor, more preferably mounted onto said vehicle, for detecting a longitudinal and/or lateral acceleration of the vehicle, the further sensor being connected to said at least one processing unit.

Preferably the system comprises a still further sensor, more preferably mounted onto said vehicle, for detecting a forward speed of the vehicle, the still further sensor being connected to said at least one processing unit.

In this way it is possible to detect the longitudinal and/or lateral acceleration and/or the forward speed of the vehicle for controlling the obtaining of the first (and possibly second) values when the longitudinal acceleration and/or the lateral acceleration and/or the forward speed are within the aforesaid respective ranges of values. Preferably said one or more operating conditions of the tyre are chosen in the group: pressure, angular velocity, vertical load and length of a footprint area (or a length correlated to the length of the footprint area). In this way the main conditions that can affect the behaviour of the tyre, and therefore physically correlated to the value of the calibration physical quantity, are used.

Preferably said system comprises a pressure sensor, more preferably mounted onto said tyre, for detecting a pressure of the tyre, the pressure sensor being connected to said at least one processing unit.

Preferably said system comprises a sensor able to detect an angular velocity of the tyre, more preferably mounted onto a hub of said vehicle onto which said tyre is fitted, the sensor able to detect the angular velocity being connected to said at least one processing unit. Alternatively, the angular velocity can be measured by the same sensor on which the calibration is carried out.

In this way it is possible to detect the current values of the operating conditions of the tyre in a simple way.

Preferably said sensor is fixed at a portion of inner surface of the tyre belonging to said crown portion.

Preferably said motion signal is representative of (at least) one component of a, more preferably linear, acceleration of said motion of the crown portion, more preferably of said motion of said portion of inner surface. In this way the sensor is installed on a protected part of the tyre as its inner cavity, and moreover a meaningful motion quantity is detected.

Preferably said (at least one) component of the acceleration is chosen in the group: axial acceleration, radial acceleration and tangential acceleration.

In one embodiment said motion signal is representative of (at least) one component (e.g., axial, radial and/or tangential) of a displacement/deformation of said crown portion, more preferably of said portion of inner surface Preferably said sensor is an accelerometric (or, respectively, displacement/deformation) sensor configured for detecting (at least) one component (up to three components) of a, typically linear, acceleration (or, respectively, of a displacement/deformation) of said motion of the crown portion, more preferably of said portion of inner surface.

In a first embodiment said motion signal is representative of a radial component of the motion (preferably of a radial acceleration) of the crown portion and said calibration physical quantity is a maximum value (in absolute value) of a radial displacement of the crown portion in a footprint area of the tyre.

In said first embodiment said processing said motion signal comprises:

obtaining from said motion signal (preferably by double integration of said motion signal representative of the radial acceleration) a signal representative of the radial displacement of said crown portion (preferably of said portion of inner surface);

identifying, in said signal representative of the radial displacement, a maximum value (in absolute value) in a footprint area, said maximum value (in absolute value) being said first value representative of said calibration physical quantity.

The Applicant has in fact understand that the maximum value of the radial displacement (i.e., the maximum deformation undergone by the tyre in the footprint area) is suitable for the calibration method, as it is both detectable by the sensor and calculable through a predetermined correlation in a sufficiently precise way.

It is observed that the signal representative of the radial displacement can be directly obtained from the sensor (after filtering), in case of deformation/displacement sensor, or obtained by double integration of the original motion signal (i.e., obtained directly from the sensor) representative of a radial acceleration of the crown portion.

In a second embodiment said motion signal is representative of a radial component of the motion (preferably of the radial acceleration) of the crown portion, and said calibration physical quantity is an out-of-footprint radial acceleration.

In this second embodiment said processing said motion signal comprises:

obtaining from said motion signal a signal representative of the radial acceleration of said crown portion (preferably of said portion of inner surface);

identifying a portion of said signal representative of the radial acceleration at which said sensor is outside a footprint area of the tyre, wherein said first value representative of the calibration physical quantity is obtained from a (e.g., average) value of said signal representative of the radial acceleration in said portion of signal.

The Applicant has in fact understand that the out-of-footprint radial acceleration is suitable for the calibration method, as it is both detectable by the sensor and calculable through a predetermined correlation in a sufficiently precise way.

It is observed that the signal representative of the radial acceleration can be directly obtained from the sensor (after filtering), or obtained by derivation from an original motion signal (i.e., obtained directly from the sensor) representative of a radial component of the displacement/deformation of the crown portion.

Preferably, in the second embodiment, said one or more operating conditions of the tyre comprise an angular velocity and a pressure. The out-of-footprint radial acceleration (i.e., the centripetal acceleration undergone by the sensor due only to the rotation of the tyre) is mathematically correlated to the values of the aforesaid operating conditions (angular velocity and pressure).

In a third embodiment said motion signal is representative of a tangential component of the motion (preferably of a tangential acceleration) of the crown portion and said calibration physical quantity is a maximum value (in absolute value) of a tangential speed of the crown portion in a footprint area In this third embodiment said processing said motion signal comprises:

obtaining from said motion signal (preferably by integration of said motion signal representative of the tangential acceleration) a signal representative of the tangential speed of said crown portion (preferably of said portion of inner surface);

identifying, in said signal representative of the tangential speed, a maximum value (in absolute value) in the footprint area, said maximum value (in absolute value) being said first value representative of said calibration physical quantity.

The Applicant has in fact understand that the maximum value of the tangential speed in the footprint is suitable for the calibration method, as it is both detectable by the sensor and calculable through a predetermined correlation in a sufficiently precise way.

Preferably, in said first and third embodiment, said one or more operating conditions of the tyre comprise a footprint parameter representative of a length of the footprint area. The Applicant has realized that the maximum value (in absolute value) of the radial displacement in the footprint area (i.e., the maximum flattening of the tyre along the radial direction) or the maximum value (in absolute value) of the tangential speed in the footprint area, is physically correlated to the length of the footprint area. Furthermore, the length of the footprint area (or the parameter representative of it) can be obtained from a motion signal (e.g., representative of a radial or tangential acceleration) of a sensor, regardless of the calibration of this sensor (i.e., also with uncalibrated sensor). In fact, the temporal (and therefore angular) position, within the signal, of the physical points of the footprint area (e.g., entry into/exit from the footprint area or other relevant characteristic points) is not affected by the calibration. Preferably acquiring a respective current value of said footprint parameter comprises identifying in said motion signal and/or in a further motion signal (which can be obtained from said motion signal, e.g., through one or more integrations/derivations, or it can even be a different motion signal for example taken on a different motion component), two instants corresponding to two characteristic points (for example two end-points) of said motion signal and/or of said further motion signal in the footprint area, said current value of the footprint parameter being calculated as a function of a distance between said two instants.

BRIEF DESCRIPTION OF THE DRAWINGS

FIGS. 3a-c schematically show an example of a motion signal representative of, respectively, a radial acceleration, a radial speed and a radial displacement;

FIGS. 4a-c schematically show an example of a motion signal representative of, respectively, a tangential acceleration, a tangential speed and a tangential displacement.

DETAILED DESCRIPTION OF SOME EMBODIMENTS OF THE PRESENT INVENTION

The features and advantages of the present invention will be further clarified by the following detailed description of some embodiments of the present invention, presented by way of non-limiting example, with reference to the attached figures.

Figure 1:
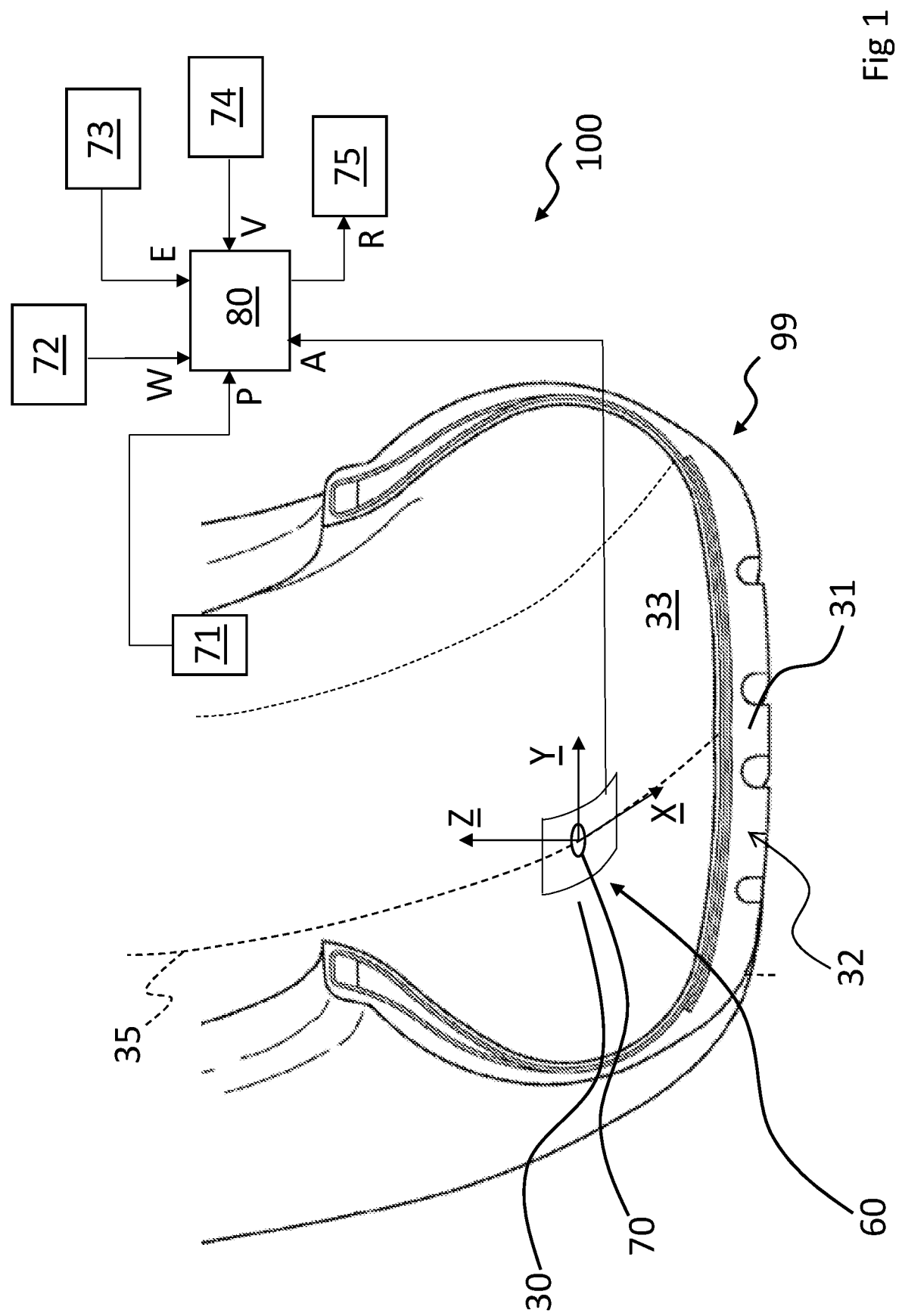
FIG. 1 shows a schematic, perspective and partial view of a tyre section comprising a sensor for tyres belonging to the calibration system according to the present invention, schematized in the figure.

In FIG. 1 with the reference number 100 a calibration system of a sensor 70 for tyres according to the present invention is schematically shown. The sensor 70, exemplarily a triaxial accelerometric sensor (e.g., of the MEMS type), is included in a monitoring device 60 fixed at a portion 30 of inner surface 33 of a tyre 99 belonging to a crown portion 31 of the tyre 99 (i.e., the portion of tyre 99 at the tread band 32). The monitoring device 60 can incorporate (not shown) a transmission/receiving system and an electronic unit for the control of the sensor itself and/or for the pre-processing or the conditioning of the signal.

Typically, the monitoring device 60 (with the sensor 70) is fixed at a median plane of the tyre 99 (indicated by the dashed line 35). All figures are shown not to scale, for illustrative purposes only.

The accelerometric sensor 70 is advantageously positioned in such a way that its three axes are aligned respectively with the axes X (along the longitudinal/tangential direction), Y (along the axial direction) and Z (along the radial direction) and it is configured for separately detecting a tangential acceleration (directed along the X axis), an axial acceleration (directed along the Y axis) and a radial acceleration (directed along the Z axis) undergone by the portion 30 of inner surface 33 of the tyre 99.

The calibration system 100 comprises a processing unit 80 in communication, exemplarily by means of the communication line A (for example wireless), with the monitoring device 60 for receiving an accelerometric signal acquired by the sensor 70 and representative of the three components of the detected linear acceleration.

The present invention contemplates any logical and/or physical arrangement and division of the processing unit, which can for example be a single physical and/or logical unit or composed of several distinct and cooperating physical and/or logical units, such units being able to be located, in whole or in part, in the monitoring device 60 itself, in the tyre, in the rim, on board of the vehicle (not shown) on which the tyre 99 is fitted, and/or in a remote station in connection with the vehicle on which the tyre 99 is fitted.

Exemplarily the processing unit 80 is connected, exemplarily by means of the communication line R (with or without wires), to a display device 75, for example the screen of the on-board computer of the vehicle, to transmit a notice of successful calibration of the accelerometric sensor 70.

Exemplarily the calibration system 100 also comprises a pressure sensor 71, exemplarily fixed in the valve or on the inner surface of the tyre 99 (for example in the monitoring device 60 itself), and configured to detect a pressure of the tyre 99 (i.e., the inflation pressure of the tyre in the inner cavity of the tyre). The pressure sensor 71 is in communication, exemplarily through the communication line P (for example without wires), with the processing unit 80 to transmit the measured current pressure value.

Exemplarily the calibration system 100 comprises also a sensor 72 capable of detecting an angular velocity of the tyre 99 (hereinafter angular velocity sensor 72), exemplarily mounted on a hub (not shown) of the vehicle on which the tyre 99 is fitted (e.g., being part of the CAN or ABS system of the vehicle). The angular velocity sensor 72 is in communication, exemplarily through the communication line W (with or without wires), with the processing unit 80 to transmit the measured current angular velocity value.

Alternatively, the current angular velocity value can be obtained directly from the signal generated by the sensor 70.

Exemplarily the calibration system 100 comprises also a further sensor 73 (e.g., an acceleration sensor), exemplarily mounted on the vehicle (e.g., being part of the inertial platform of the vehicle), and structured to detect a longitudinal and/or lateral acceleration of the vehicle (and consequently of the tyre 99). The further sensor 73 is in communication, exemplarily through the communication line E (with or without wires), with the processing unit 80 to transmit the measured longitudinal and/or lateral acceleration value.

Exemplarily the calibration system 100 comprises also a still further sensor 74 (e.g., a speed sensor), exemplarily mounted on the vehicle, and structured to detect a forward speed of the vehicle (and consequently of the tyre 99). The still further sensor 74 is in communication, exemplarily through the communication line V (with or without wires), with the processing unit 80 to transmit the measured forward speed value.

Exemplarily the processing unit 80 is programmed and configured to carry out the operations described below.

Figure 2:
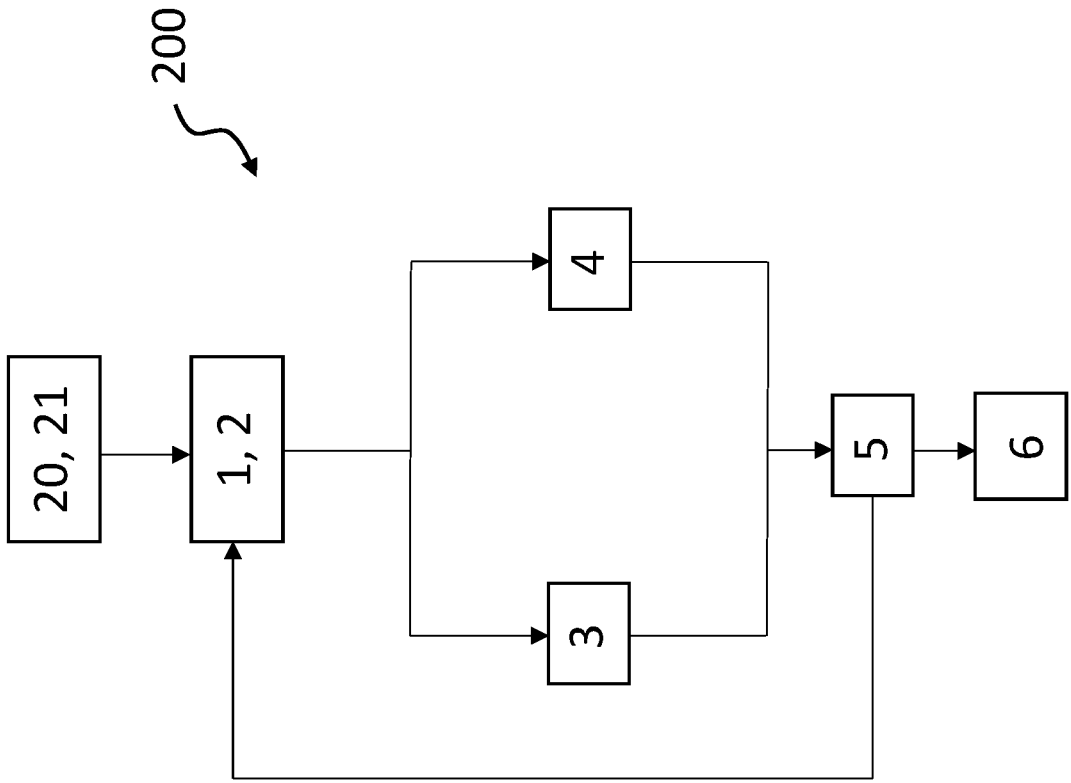
FIG. 2 shows a flow diagram of a calibration method of a sensor for tyres according to the present invention.

FIG. 2 shows a flow chart of an example of a calibration method 200 of a sensor 70 (e.g., a triaxial accelerometric sensor) for tyres according to the present invention, which can be implemented with the calibration system 100 described above.

First of all, the monitoring device 60 (with the accelerometric sensor 70) is fixed 20 at the portion 30 of inner surface 33 of the tyre 99 (for example by gluing). The tyre 99 is then fitted for example on a rim and it is inflated to a desired pressure, exemplarily equal to the operating pressure of the tyre 99, for example equal to 200 kPa, and then fitted 21 on the vehicle.

During the advancement of the vehicle, the accelerometric sensor 70 acquires 1, preferably at each wheel turn, a signal representative of the linear acceleration of the portion 30 of inner surface 33. Exemplarily the acquired signal can be representative of all three components of the acceleration or one/two components of the acceleration.

Furthermore, a respective current value of one or more operating conditions of the tyre 99 temporally associated with the acquired signal is acquired 2. In case the operating conditions of the tyre are pressure and angular velocity, the acquisition of the current value is carried out by dedicated sensors (e.g., pressure sensor 71) or through the CAN and/or ABS sensors of the vehicle (e.g., angular velocity sensor 72). The angular velocity can also be obtained from the signals acquired by the sensor 70 (on any component of the acceleration), for example from the time distance between corresponding peaks in signals acquired at different turns of the tyre 99 (for example signal peaks occurring at the passage of the sensor in the footprint area of the tyre 99).

Preferably, for example after the acquisition 1 of the signal, it is provided to verify that the signal has been acquired satisfying at least one of the following conditions (exemplarily all three of the following conditions): longitudinal and lateral acceleration of the vehicle less than or equal to 5 m/s², and vehicle forward speed between 30 km/h and 250 km/h (extremes included). If these conditions are not met, the acquired signal is discarded (or, for example in the case of the speed, it is not even acquired) and a new acquisition is considered. Alternatively, it is possible to enable the acquisition of the signal only when at least one of the above said conditions occurs.

In case the signal has been acquired with the aforesaid conditions satisfied, subsequently the method 200 preferably comprises a pre-processing of the raw signal generated by the sensor 70, exemplarily through at least one or more filtering operations (e.g., comprising direct and inverse Fourier transforms and low-pass filtering).

Subsequently, the method 200 comprises processing 3 the acquired (and typically pre-processed) signal to obtain a first (uncalibrated) value representative of a calibration physical quantity associated with the motion of the portion 30 of inner surface 33 at the respective current value of the one or more operating conditions.

The method 200 further comprises calculating 4 a second value (i.e., estimating the real value) representative of the calibration physical quantity at the same respective current value of the one or more operating conditions, by a predetermined mathematical correlation between the calibration physical quantity and the one or more operating conditions.

The predetermined mathematical correlation can be obtained from known geometric and/or physical-mathematical models and/or simulations that correlate the physical quantities of the tyre (e.g., deformation, speed and acceleration) with different operating conditions of the same. In combination with these models, the predetermined mathematical correlation, and/or one or more coefficients of this mathematical correlation, can be obtained by previously carrying out a test campaign (typically indoor, for example through a test machine of the type MTS Flat Trac®) on a sample tyre of the same model as the tyre 99 to be fitted on the vehicle. On this sample tyre, at least one sample sensor of the same model as the sensor 70 and previously calibrated (for example by a known off-line calibration method using a known calibration apparatus) is fixed.

In particular, the method can exemplarily provide to iterate the aforesaid operations 1-4 for a predetermined number, e.g., twenty, of iterations/turns, during which typically the respective current value of the one or more operating conditions varies according to the driving conditions, needs or preferences. In this way, a first set of first values representative of the calibration physical quantity and a corresponding second set of second values representative of the calibration physical quantity are obtained.

At this point, at least one calibration coefficient of the sensor 70 is calculated, for example a gain of a characteristic curve of the sensor 70, by comparison between the first and second set, by a function interpolating the first and second values, for example by linear regression.

The method 200 continues to carry out the subsequent iterations, as the current values of the one or more operating conditions vary.

At the end of each subsequent iteration, the calculation of the calibration coefficient(s) by comparing the current first and second set is updated, and an output condition 5 is verified.

This output condition can for example be a predetermined number of iterations (for example one thousand iterations/turns).

Alternatively, this output condition can be determined dynamically: for example, at each iteration, the variance of the set of calibration coefficients obtained up to that point is calculated. When, for a (predetermined) number of consecutive iterations (e.g., ten), the variance remains below a predetermined threshold (e.g., 1%), the iteration is stopped and the current value of the calibration coefficient(s) is used to calibrate 6 the sensor 70.

In the following, with reference to FIGS. 3a-c and 4a-c, three different embodiments of the method of the present invention will be illustrated, which differ in how to implement the above said operations 3 and 4. In FIGS. 3a-c and 4a-c, the represented signal temporally corresponds to the lower half-turn of the tyre (including the footprint area) with the ordinate axis expressed in arbitrary units and the abscissa axis expressed in degrees (angular position). In fact, advantageously, the present invention (in particular with reference to the three embodiments explained below) also works when the sensor is programmed (for normal use as during the calibration) to acquire the motion signal only on a portion of turn of the wheel comprising the footprint area (for example the lower half of the turn or a portion that subtends an axis angle of 120° and centered in the footprint area).

In a first embodiment, the acquired signal is representative of the radial acceleration of the motion (FIG. 3a shows an example of this signal, exemplarily filtered) and the calibration physical quantity is the maximum value in absolute value of the radial displacement of the portion 30 of inner surface 33 in a footprint area, i.e., the maximum deformation (flattening) undergone by the tyre 99 in the footprint area in the radial direction.

In this first embodiment, the processing 3 of the acquired signal exemplarily comprises:

obtaining by double integration of the acquired signal (uncalibrated and preferably filtered) a signal representative of the radial displacement of the portion 30 of inner surface 33 (FIG. 3c exemplarily shows this signal representative of the radial displacement as obtained by double integration from the signal of FIG. 3a);

identifying, in this signal representative of the radial displacement, a maximum value in absolute value in the footprint area.

Exemplarily this value coincides in FIG. 3c with an amplitude of the peak 201, indicated by the double arrow, calculated with respect to an arbitrary reference, schematically indicated by the line 150.

This maximum value is the first value representative of the calibration physical quantity.

In this first embodiment, exemplarily the one or more operating conditions of the tyre 99 comprise a footprint parameter representative of a length of the footprint area. Exemplarily the acquisition of the current value of the footprint parameter comprises:

obtaining by single integration of the acquired signal a signal representative of a radial component of the speed of the motion, hereinafter referred to as the radial speed signal (FIG. 3b exemplarily shows this signal as obtained by integration from the signal of FIG. 3a);

identifying in the radial speed signal two instants corresponding to two characteristic points in the footprint area. Exemplarily in FIG. 3b the two instants correspond respectively to an absolute maximum (e.g., peak 202) and an absolute minimum (e.g., peak 203) of the radial speed signal;

calculating the current value of the footprint parameter as a function of a distance (temporal, angular or linear, schematically indicated by the double arrow 180 in FIG. 3b) between said two instants.

In this way it is possible to accurately calculate the current value of the footprint parameter.

The current value of the footprint parameter can be calculated on any signal representative of any spatial component (i.e., radial/tangential/axial) of the acceleration, speed or displacement. Exemplarily the current value of the footprint parameter can be calculated on a signal representative of a tangential acceleration (FIG. 4a) or on a signal representative of a tangential component of the displacement (FIG. 4c), or on the same signal as in FIG. 3a, identifying two instants corresponding to two easily recognizable characteristic points in the footprint area (e.g., relative or absolute extremes). The Applicant has in fact realized that, in the motion signals, the angular (or temporal) position of the characteristic points in the footprint area is not influenced by the calibration. In other words, even on uncalibrated signals, such as those represented in FIGS. 3a-c and 4a-c, the angular position of the characteristic points (and therefore their angular distance) reflects the real one. The actual current value of the footprint parameter can therefore be estimated also on uncalibrated signals.

In the first embodiment, the one or more operating conditions can exemplarily be the footprint parameter only, or in addition also the angular velocity and the pressure. According to a first example, since there is a relationship of substantial proportionality between the footprint parameter and the maximum value of the radial displacement, a predetermined mathematical correlation can be exemplarily expressed by the following formula:

$$DR = a_0 + a_1 PL$$

wherein DR is the maximum value in absolute value of the radial displacement, PL is the footprint parameter and $a_0$ and $a_1$ are specific coefficients for the tyre model that can be obtained by test campaigns as previously described or by simulation models. In another example, since both the absolute maximum value of the radial displacement and the footprint parameter increase as the vertical load increases and decrease as the pressure increases, the predetermined mathematical correlation (DR as a function of PL, ω, and p) can be exemplarily obtained by solving the system of the following relations that link radial displacement and footprint parameter to the vertical load:

$$F = b_0 + b_1 \omega PL + b_2 PL p + b_3 \omega^2 + b_4 PL^2 + b_5 p^2$$
$$F = c_0 + c_1 \omega DR + c_2 \omega p + c_3 DR p + c_4 \omega^2 + c_5 DR^2 + c_6 p^2$$

wherein F is the vertical load, ω is the angular velocity, PL is the footprint parameter, DR is the maximum value in absolute value of the radial displacement, p is the pressure and $b_0$-$b_5$ and $c_0$-$c_6$ are specific mathematical coefficients for each tyre model that can be obtained by test campaigns as described above or by simulation models.

By comparison (for example by linear or polynomial regression) between the first values representative of the maximum radial displacement obtained by processing the radial acceleration signal and the second values of the maximum radial displacement estimated—for example—by the above relations, it is therefore possible to carry out the calibration of the sensor used for the acquisition of the signal itself.

In a second embodiment, the acquired motion signal is representative of the radial acceleration of the motion (for example shown in FIG. 3a) and the calibration physical quantity is an out-of-footprint radial acceleration.

In this second embodiment, the processing 3 of the acquired signal comprises identifying a portion of the acquired (and filtered) signal at which the sensor 70 is outside the footprint area of the tyre 99.

With reference to FIG. 3a, exemplarily this portion of the signal in which the sensor is outside the footprint corresponds to the two signal sub-portions before and after the dashed lines 400. The signal portion inside the lines 400 corresponds to the footprint area. This part can be identified by predetermining the part of the signal not to be considered in the processing 3, for example the part of the turn that subtends an angle of 80° centered in the center of the footprint area. Alternatively, this part of the signal can be identified by identifying in the graph of the acquired and filtered signal the two points (schematically indicated by the two circles in FIG. 3*a*) closest to the peak corresponding to the center of the footprint area and having a value equal to the average value of the acceleration on the entire signal.

Once the aforesaid portion of the out-of-footprint signal has been identified, the first value representative of the calibration the physical quantity is exemplarily obtained from an average value (e.g., by an average of the values) of the acquired (uncalibrated and preferably raw) signal at the aforesaid portion of the out-of-footprint signal.

In this second embodiment, the one or more operating conditions exemplarily are pressure and angular velocity.

Since, outside the footprint area of the tyre, the curvature radius of the tyre can be considered substantially constant, the out-of-footprint radial acceleration (corresponding to the centripetal acceleration of the sensor) can be estimated using the known expression that, for a circular trajectory, links the centripetal acceleration to the angular velocity and the radius of the trajectory. Therefore, the predetermined mathematical correlation can be:

$$a = \omega^2 R$$

wherein a is the out-of-footprint radial acceleration, ω is the angular velocity of the tyre and R is a radial distance between the sensor and a rotation axis of the tyre outside the footprint. This radial distance R increases as the angular velocity and the pressure increase and can be exemplarily expressed by the following formula:

$$R = d_0 + d_1 \omega p + d_2 \omega^2$$

wherein p is the pressure and $d_0$-$d_2$ are specific coefficients for the tyre model that can be obtained by test campaigns as described above or by simulation models.

By comparison (for example by linear or polynomial regression) between the first values representative of the out-of-footprint radial acceleration obtained by processing of the radial acceleration signal and the second values of the out-of-footprint radial acceleration estimated—for example—by the above relations, it is therefore possible to calibrate the sensor used for the acquisition of the signal itself. In a third embodiment, the acquired signal is representative of the tangential acceleration (FIG. 4*a* shows an example of this signal, exemplarily filtered and uncalibrated) and the calibration physical quantity is the maximum value of the tangential speed of the portion 30 of inner surface 33 in the footprint area.

In this third embodiment, the processing 3 of the acquired signal comprises:

obtaining by single integration of the acquired signal (uncalibrated and preferably filtered) a signal representative of the tangential speed of the portion 30 of inner surface 33 of the tyre 99 (FIG. 4*b* shows an example of this signal representative of the tangential speed as obtained by integration from the signal of FIG. 4*a*);

identifying, in the signal representing the tangential speed, a maximum value in absolute value in the footprint area.

Exemplarily this value coincides in FIG. 4*b* with the amplitude of the peak 302 with respect to an arbitrary reference 151, as indicated for example by the double arrow. This maximum value is the first value representative of the calibration physical quantity.

In this third embodiment, the one or more operating conditions of the tyre 99 are exemplarily the angular velocity, the pressure and a parameter representative of a length of the footprint area (or footprint parameter).

The Applicant has verified that the maximum value (in absolute value) of the tangential speed in the footprint area increases as the angular velocity and the footprint length increase. In addition, also the pressure influences (albeit marginally) the maximum value of the tangential speed in the footprint area. Therefore, it is possible to derive simple polynomial relations that link together the maximum value of the tangential speed in the footprint area, the footprint length or parameter, the angular velocity and possibly the pressure. The coefficients of these relations can be determined, for each tyre model, by test campaigns as described above or by simulation models.

The acquisition of the current value of the parameter representative of the length of the footprint area can be carried out by identifying two instants corresponding to the respective absolute maximum and minimum of the acquired signal representative of the tangential acceleration (e.g., the peaks 300 and 301 in FIG. 4*a*) or of the signal representative of the tangential component of the displacement/deformation, e.g., the peaks 303 and 304 on the signal of FIG. 4*c*, obtained for example by double integration of the acquired signal of FIG. 4*a*, and calculating the current value of the footprint parameter as a function of their distance (schematically indicated by the double arrow 181 in FIG. 4*a* or 182 in FIG. 4*c*).

By comparison (for example by linear or polynomial regression) between the first values representative of the maximum value of the maximum tangential speed in the footprint obtained by processing of the tangential acceleration signal and the second values of the maximum value of the tangential speed estimated—for example—by polynomial relations as described above, it is therefore possible to calibrate the sensor used for the acquisition of the signal itself.

The invention claimed is:

1. A method for calibrating a sensor for tyres, wherein, with the sensor is mounted at a crown portion of a tyre and during an advancement of a vehicle onto which the tyre is fitted, the method comprises:

a) acquiring, from the sensor, a motion signal representative of a motion of the crown portion;

b) acquiring a respective current value of one or more operating conditions of the tyre;

c) processing the motion signal to obtain from the motion signal, a first value representative of a calibration physical quantity associated with the motion of the crown portion at the respective current value of the one or more operating conditions;

d) calculating a second value representative of the calibration physical quantity at the respective current value of the one or more operating conditions, by a predetermined mathematical correlation between the calibration physical quantity and the one or more operating conditions;

e) repeating steps a)-d) to obtain a first set of first values representative of the calibration physical quantity varying the respective current value of the one or more operating conditions, and a corresponding second set of second values representative of the calibration physical quantity; and f) calibrating the sensor by a comparison between the first and second set.

2. The method according to claim 1, wherein the processing the motion signal is carried out when one or more of the following conditions occur:

a lateral acceleration of the vehicle is less than or equal to 5 m/s²;

a longitudinal acceleration of the vehicle is less than or equal to 5 m/s²; or a forward speed of the vehicle is greater than or equal to 20 km/h.

3. The method according to claim 1, wherein the motion signal is representative of one component of a linear acceleration of the motion of the crown portion, wherein the component of the acceleration is chosen from: axial acceleration, radial acceleration and tangential acceleration, and wherein the one or more operating conditions of the tyre are chosen from: pressure, angular velocity, vertical load and length of a footprint area.

4. The method according to claim 1, wherein the motion signal is representative of a radial component of the motion of the crown portion and the calibration physical quantity is a maximum value in absolute value of a radial displacement of the crown portion in a footprint area, and wherein the processing the motion signal comprises:

obtaining from the motion signal, a signal representative of the radial displacement of the crown portion; and identifying, in the signal representative of the radial displacement, a maximum value in absolute value in the footprint area, wherein the maximum value in absolute value is the first value representative of the calibration physical quantity.

5. The method according to claim 1, wherein the motion signal is representative of a radial component of the motion of the crown portion and the calibration physical quantity is an out-of-footprint radial acceleration, wherein the processing the motion signal comprises:

obtaining from the motion signal, a signal representative of the radial acceleration of the crown portion; and identifying a portion of the signal representative of the radial acceleration at which the sensor is outside a footprint area of the tyre, wherein the first value representative of the calibration physical quantity is obtained from a value of the signal representative of the radial acceleration in the portion of signal, and wherein the one or more operating conditions of the tyre comprise an angular velocity and a pressure.

6. The method according to claim 1, wherein the motion signal is representative of a tangential component of the motion of the crown portion and the calibration physical quantity is a maximum value in absolute value of a tangential speed of the crown portion in a footprint area, and wherein the processing the motion signal comprises:

obtaining from the motion signal, a signal representative of the tangential speed of the crown portion; and identifying, in the signal representative of the tangential speed, a maximum value in absolute value in the footprint area, wherein the maximum value in absolute value is the first value representative of the calibration physical quantity.

7. The method according to claim 1, wherein the one or more operating conditions of the tyre comprise a footprint parameter representative of a length of the footprint area, and wherein acquiring a respective current value of the footprint parameter comprises identifying in the motion signal, or in a further motion signal, or in both, two instants corresponding to two characteristic points of the motion signal, or of the further motion signal in the footprint area, or of both, wherein the current value of the footprint parameter is calculated as a function of a distance between the two instants.

8. The method according to claim 1, wherein the comparison between the first and second set comprises calculating an interpolating function on the first and second values of, respectively, the first and second set, wherein calibrating the sensor comprises, for each repeating steps of a), b), c), and d), calculating at least one respective calibration coefficient by comparison between the respective first and second set.

9. A calibration system for a sensor for tyres, the system comprising:

the sensor mounted at a crown portion of a tyre for detecting a motion of the crown portion;

at least one processing unit in communication with the sensor and programmed for, during an advancement of a vehicle on which the tyre is fitted:

a) receiving, from the sensor, a motion signal representative of the motion of the crown portion;

b) acquiring a respective current value of one or more operating conditions of the tyre;

c) processing the motion signal to obtain from the motion signal, a first value representative of a calibration physical quantity associated with the motion of the crown portion at the respective current value of the one or more operating conditions;

d) calculating a second value representative of the calibration physical quantity at the respective current value of the one or more operating conditions, by a predetermined mathematical correlation between the calibration physical quantity and the one or more operating conditions;

e) repeating steps a)-d) to obtain a first set of first values representative of the calibration physical quantity varying the respective current value of the one or more operating conditions, and a corresponding second set of second values representative of the calibration physical quantity; and f) calibrating the sensor by a comparison between the first and second set.

10. The system according to claim 9, wherein the sensor is fixed at a portion of inner surface of the tyre belonging to the crown portion, wherein the sensor is an accelerometric sensor configured for detecting one component of a linear acceleration of the motion of the crown portion, wherein the system comprises:

a pressure sensor mounted onto the tyre for detecting a pressure of the tyre, wherein the pressure sensor is connected to the at least one processing unit;

a sensor for detecting an angular velocity of the tyre, wherein the sensor is mounted onto a hub of the vehicle onto which the tyre is fitted, and is connected to the at least one processing unit;

a further sensor mounted onto the vehicle for detecting a longitudinal, or lateral acceleration of the vehicle, or both, wherein the further sensor is connected to the at least one processing unit; and a still further sensor mounted onto the vehicle for detecting a forward speed of the vehicle, wherein the still further sensor is connected to the at least one processing unit, wherein the motion signal is representative of the component of the linear acceleration of the motion of the crown portion, wherein the component of the acceleration is chosen from: axial acceleration, radial acceleration and tangential acceleration, and wherein the one or more operating conditions of the tyre are chosen from: pressure, angular velocity, vertical load and length of a footprint area.

* * * * *